Patented Oct. 14, 1952

2,614,099

UNITED STATES PATENT OFFICE 2,614,099

ANION EXCHANGE RESINS

William C. Bauman and Robert McKellar, Midland, Mich., assignors to The Dow Chemical Company, Midland, Mich., a corporation of Delaware No Drawing. Application December 29, 1948, Serial No. 68,035

12 Claims. (Cl. 260—83.1)

This invention concerns certain new strongly basic anion exchange resins that are quaternary ammonium bases or salts thereof. It pertains more particularly to water-insoluble anion exchange resins containing quaternary ammonium groups, which resins are characterized by their favorable capacity to absorb a relatively large proportion of anions and by their efficiency to be regenerated by treatment with an aqueous solution of a salt or a base.

An anion exchange resin that is a quaternary ammonium base or a salt thereof may be prepared by reacting a vinyl-aromatic resin having halomethyl radicals attached to its aromatic nuclei with a tertiary amine.

In application Serial No. 68,056 of G. D. Jones, filed December 29, 1948, and in application Serial No. 68,064 of McMaster et al., filed December 29, 1948, a number of anion exchange resins that are quaternary ammonium bases or salts thereof, are described. The specific anion exchange resins disclosed in the aforementioned applications are all composed of the reaction product of a tertiary alkyl amine and a vinyl-aromatic resin having halomethyl radicals attached to aromatic nuclei in the resin, or are composed of the reaction product of a tertiary carbocyclic or heterocyclic amine and such vinyl-aromatic resin.

In general, the anion exchange resins composed of the reaction products of tertiary amines and a vinyl-aromatic resin having halomethyl radicals attached to aromatic nuclei in the resin vary widely in their capacity to absorb anions and in their selectivity for various anions. One such resin may preferentially absorb a certain anion from a solution containing a mixture of anions, whereas another of the resins preferentially absorbs a different anion from such solution. For instance, the reaction product of a tertiary alkyl amine, e. g. trimethylamine, triethylamine, tributylamine, etc., and a vinyl-aromatic resin having halomethyl radicals attached to its aromatic nuclei, has a high selectivity for chloride ions in aqueous solutions containing both hydroxyl ions and chloride ions.

When a bed of an anion exchange resin that has a high selectivity for certain anions, e. g. chloride ions, has absorbed its capacity of such ions, it is difficult to displace the absorbed ions from the resin by treatment with an aqueous solution of a base containing hydroxyl ions. Thus, to regenerate a bed of the resin it frequently requires an amount of hydroxyl ions corresponding to from 5 to 20 times the chemical equivalent capacity of the resin. The reversible reaction involved may be represented by the equation:

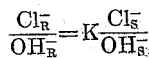

wherein

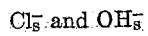

represent the respective concentrations, e. g. in gram atomic weights per liter, of chloride and hydroxyl ions in the solution contacted with the anion exchange resin,

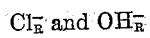

represent the respective concentrations of these same ions, e. g. as gram atomic weights per unit volume of the anion exchange resin, chemically combined with the anion exchange resin and K is a constant. When the selectivity constant K has a value greater than one, the anion exchange resin has a preferential selectivity for chloride ions. When the constant K has a value equal to one, the anion exchange resin absorbs chloride and hydroxyl ions with equal ease, i. e. the resin has no prefential selectivity for either chloride or hydroxyl ions. A bed of the resin in chloride form can readily be regenerated to its hydroxide form by washing with an aqueous solution of a base and vice versa. In general, a bed of an atom exchange resin that has a value for the selectivity constant of from 0.8 to 10 can be efficiently regenerated by washing the resin with an aqueous solution of a base or of a salt containing different anions.

We have now found that a water-insoluble anion exchange resin that is a quaternary ammonium base or a salt thereof, which resin has improved ion exchange properties can be prepared by reacting the tertiary mono- and di-alkyl N-substituted alkanol and alkanediol amines with a vinyl-aromatic resin having halomethyl radicals attached to its aromatic nuclei.

The anion exchange resins are strongly basic and they all contain a basic nitrogen atom of a tertiary mono- or di-alkyl N-substituted alkanol or alkanediol amine attached to a methyl substituent on an aromatic nucleus of the resin. The products are all insoluble in dilute aqueous acid and dilute aqueous alkali solutions, e. g. in hydrochloric acid or sodium hydroxide solutions of 10 weight per cent concentration. They are also substantially insoluble at room temperature in organic solvents such as acetone, ethanol, benzene, ethylene dichloride, chlorobenzene or carbon tetrachloride, etc. The anion exchange resins have good capacity for absorbing anions and they can readily and efficiently be regenerated by treatment with aqueous solutions of bases and salts. A large proportion of the absorbed anions can readily be displaced from the resin by an amount of an aqueous solution containing a chemical equivalent proportion of different anions of a salt or a base.

The vinyl-aromatic resins to be employed as starting materials are the normally solid benzene-insoluble copolymers of monovinyl aromatic compounds, and a polyvinyl-aromatic compound, which copolymers contain from 0.5 to 40, preferably from 0.5 to 20 per cent by weight of the polyvinyl-aromatic compound chemically combined, i. e. interpolymerized with the monovinyl-aromatic compounds.

The monovinyl-aromatic compounds are selected from the benzene and naphthalene series, i. e. they contain not more than 10 carbon atoms in the aromatic nucleus, which monovinyl-aromatic compounds may contain in addition to the vinyl radical, from 1 to 3 halogen or lower alkyl radicals other than a tertiary alkyl radical, attached to the aromatic nucleus. The alkyl substituents are preferably methyl radicals. Examples of such monovinyl-aromatic compounds are styrene, ar-methylstyrene, ar-dimethylstyrene, ar-ethylvinylbenzene, ar-chlorostyrene, vinylnaphthalene, ar-methyl-vinylnaphthalene, ar-sec.-butylstyrene and ar-trimethylstyrene. The polyvinyl-aromatic compounds are also selected from the benzene and naphthalene series. Examples of polyvinyl-aromatic compounds are divinylbenzene, ar-divinyltoluene, ar-divinylxylene, divinylnaphthalene and ar-divinyl-ethylbenzene.

The copolymers may be prepared by any of the usual methods employed to polymerize monomeric vinyl type compounds. For instance, a mixture containing divinylbenzene and a monovinyl-aromatic compound, e. g. styrene, may be polymerized in mass, or in the presence of a dispersion medium for the monomers by the use of heat, light or heat and light, in the presence or absence of a polymerization catalyst, at atmospheric, subatmospheric or superatmospheric pressure.

Suitable catalysts for effecting polymerization of the monomers are the peroxides such as benzoyl peroxide, lauroyl peroxide, hydrogen peroxide, etc. Per-compounds such as potassium persulfate, sodium perborate, and ammonium persulfate may also be employed as polymerization catalysts.

The polymerization reaction is preferably carried out in aqueous dispersion, at temperatures of from 80° to 100° C., employing a peroxide, e. g. benzoyl peroxide, as catalyst. Usually, a protective colloid such as sodium cellulose glycolate, hydroxyethylcellulose, methylcellulose, etc., in amounts corresponding to from 0.01 to 0.5 per cent by weight of the monomers used, is added to the aqueous dispersion to aid in maintaining the monomers dispersed as droplets while polymerizing the same to solid hard granules.

The copolymer is separated from the aqueous dispersion, washed with water and dried, e. g. by heating in a current of hot air, or by other usual methods. The polymeric product may be crushed, ground, broken or otherwise reduced to a powdered or granular form.

The copolymers are normally solid benzene-insoluble vinyl-aromatic resins. By reacting the resins with a halomethylating agent such as chloromethyl methyl ether or bromomethyl methyl ether in the presence of a catalyst such as zinc chloride, zinc oxide, stannic chloride, aluminum chloride, tin, zinc, iron, etc., halomethyl radicals may be introduced into the resin. The halomethylation reaction, which occurs readily at temperatures in the range of from −10° to 120° C., or higher, is carried out while the copolymer is swollen by, or dispersed in, an organic liquid, e. g. tetrachloroethylene, chlorobenzene, or an excess of the halomethylating agent, which liquid is less reactive with the halomethylating agent than is the polymer. The reaction is advantageously carried to a point at which the resin product contains an average of at least one halomethyl radical per five aromatic nuclei and is usually continued until the product contains an average of from 0.8 to 1.2 halomethyl groups per aromatic nucleus. After completing the halomethylating reaction, the resin is separated, e. g. by filtration, and washed with water, or preferably is washed successively with an organic liquid such as acetone or ethyl alcohol and then washed with water. The halomethylated resin can be used directly in wet condition or in dried condition, as an agent for preparation of the anion exchange resins of this invention.

In the instance, when the monovinyl-aromatic component, chemically combined in the copolymer, contains one or more alkyl radicals, e. g. the methyl radical, as nuclear substituents, chlorine or bromine may be reacted with the copolymers in the presence of a halogenating catalyst such as phosphorus, phosphorus trichloride or light, promoting substitution of halogen in the alkyl radical, to obtain a vinyl-aromatic resin having halomethyl radicals attached to aromatic nuclei in the resin. The halogenation reaction may be carried out at temperatures of from −10° to 150° C., preferably from 50° to 80° C., while the copolymer is swollen by, or dispersed in, an organic liquid such as chlorobenzene, benzene, ortho-dichlorobenzene, acetic acid, tetrachloroethylene, carbon tetrachloride, etc., which liquid is less reactive with the chlorine or bromine than is the polymer. The reaction is advantageously carried to a point at which the resin product contains an average of at least one halogen atom per alkyl radical and is usually continued until the product contains an average of from 0.5 to 2.5, preferably from 0.8 to 1.5, halogen atoms per alkyl radical on an aromatic nucleus. The halogenation reaction is accompanied, at least to some extent, by substitution of halogen in aromatic nuclei and also in the polymeric chain of the resin.

The halogenated resin is separated from the dispersion medium by filtering, decanting, centrifuging or the like and washed with water, or preferably washed successively with an organic liquid, e. g. acetone or ethyl alcohol, then washed with water.

The vinyl-aromatic resins just described, having halomethyl radicals attached to aromatic nuclei in the resin, are reacted with a tertiary mono- or di-alkyl N-substituted alkanol or alkanediol amine to form an anion exchange resin that is a quaternary ammonium base or a salt thereof.

The tertiary amines to be employed as reactants in preparing the anion exchange resins of this invention should contain both an alkyl radical and an alkanol or an alkanediol radical attached to the nitrogen atom in the molecule. The tervalent nitrogen atom of the tertiary amine should have at least one valence, but not more than two of its valences, attached to an alkanol or an alkanediol radical and the other valence (or valences) attached to an alkyl radical as is the case when employing a tertiary N-(dialkyl) alkanol amine or a tertiary N-alkyl dialkanol amine. Examples of such tertiary amines are dimethylaminomethanol, dimethylethanolamine, dimethylisopropanolamine, diethylethanolamine, methyldiethanolamine, methyldiisopropanolamine, dimethylpropanolamine, dioctylethanolamine, 1-dimethylamino-2,3-propanediol, 1-diethylamino-2,3-propanediol, diethylisopropanolamine and dibutylethanolamine. Mixtures of any two or more of the tertiary amines may be employed in the reaction.

The proportion of the tertiary amine employed relative to the vinyl-aromatic resin reactant having halomethyl radicals attached to its aromatic nuclei, should be such that there is present in the reaction mixture at least one molecular proportion of the tertiary amine for each halomethyl radical in the vinyl-aromatic resin. The tertiary amine may be used in excess of the minimum proportion just stated. Usually from one to three molecular proportions of the tertiary amine are used per halomethyl radical in the vinyl-aromatic resin.

The quaternizing reaction, i. e. the reaction of the tertiary mono- or di-alkyl N-substituted alkanol or alkanediol amine with the vinyl-aromatic resin having halomethyl radicals attached to its aromatic nuclei, may be carried out at temperatures of from 25° to 150° C., preferably from 25° to 100° C., in the presence or absence of a dispersing medium and at atmospheric, subatmospheric or superatmospheric pressure. The reaction is usually carried out by dispersing the granular vinyl-aromatic resin having halomethyl radicals attached to its nuclei in a mixture of the tertiary amine and a liquid such as water, acetone, ethyl alcohol, etc., and heating the mixture to a temperature of from 70° to 100° C. for a period of 2 to 6 hours or longer.

It is often desirable to include a catalyst for the quaternizing reaction, among which, are cupric iodide, potassium bromide, calcium iodide, cuprous chloride, and potassium iodide, but a catalyst is not required.

The quaternized reaction product, i. e. the anion exchange resin, is separated from the reaction mixture, e. g. by filtering, and is washed with water, or preferably washed with an organic liquid such as acetone, ethyl alcohol or dioxane, then washed with water to remove any soluble components, e. g. unreacted tertiary amine.

The following examples illustrate practice of the invention, but are not to be construed as limiting the scope thereof.

EXAMPLE 1

A mixture consisting of 257 grams of a granular benzene-insoluble copolymer of 85 parts by weight styrene, 9 parts ethylvinylbenzene, 6 parts divinylbenzene and 600 cc. of chloromethyl methyl ether was placed in a flask equipped with a reflux condenser and a stirrer. The mixture was stirred and heated to a temperature of 50°–55° C. for one hour, then cooled to room temperature and 140 grams of zinc chloride added thereto as catalyst. The mixture was stirred and maintained at a temperature of about 24° C. for 7 hours, then allowed to stand for an additional 49 hours at room temperature. Thereafter, the granular chloromethylated resin was separated from the reaction mixture by filtering, washed with acetone and then washed with water. A mixture consisting of 200 cc. of the granular chloromethylated resin, 300 cc. of dimethylpropanolamine and 300 cc. of water, was placed in a flask and heated to a reflux temperature for a period of 5 hours. The aminated resin was separated from the reaction mixture by filtering and washed with water. The resin had an anion exchange capacity equivalent to 1.17 cc. of a 1 normal hydrochloric acid solution per cubic centimeter of resin. An amount of the aminated resin having a total capacity equivalent to 482.5 cc. of a 1 normal sodium hydroxide solution was placed in a glass tube having an internal diameter of 0.75 inch to form a resin bed 66 inches deep. An aqueous 1 normal sodium hydroxide solution was passed downflow through the resin at a rate of 30 cc. of solution per minute until 241.25 cc. of the solution had been fed into the resin bed. This was followed by 500 cc. of distilled water. The effluent solution was titrated for sodium hydroxide and found to contain the equivalent of 33.67 cc. of 1 normal sodium hydroxide solution. The bed of resin absorbed hydroxyl ions equivalent to 207.58 cc. of 1 normal sodium hydroxide solution, i. e. the resin was 43 per cent regenerated to its hydroxide form by an amount of sodium hydroxide chemically equivalent to one-half of the total capacity of the resin bed. The resin was then converted to its chloride form by washing with 500 cc. of a saturated sodium chloride solution, and rinsed with 250 cc. of distilled water. The effluent solution contained the equivalent of 205.5 cc. of 1 normal sodium hydroxide solution. The experiment was repeated employing an amount of the 1 normal sodium hydroxide solution equivalent to one, three and ten times the chemical equivalent capacity of the resin bed. The proportion of the resin regenerated to the hydroxide form was 58.0, 78.5 and 94.3 per cent respectively. A bed, 1 inch in diameter by 63 inches deep, of an anion exchange resin consisting of the reaction product of trimethylamine and a chloromethylated copolymer of 85 parts by weight styrene, 9 parts ethylvinylbenzene and 6 parts divinylbenzene was converted to its chloride form by washing with 500 cc. of a saturated aqueous solution of sodium chloride and then washed with water. The resin had a capacity equivalent to 1.18 cc. of a 1 normal hydrochloric acid solution per cubic centimeter of resin. The bed of resin had a total capacity equivalent to 1000 cc. of a 1 normal hydrochloric acid solution. An aqueous 1 normal sodium hydroxide solution was passed downflow through the bed of resin at a rate of 30 cc. of solution per minute until 1000 cc. of solution was fed into the resin bed. This was followed by 500 cc. of distilled water and the total effluent from the resin analyzed for sodium chloride and sodium hydroxide. The resin bed absorbed an amount of hydroxyl ions equivalent to 320 cc. of 1 normal sodium hydroxide solution. Only 32 per cent of the resin was converted to its hydroxide form by an amount of sodium hydroxide chemically equivalent to the total capacity of the resin bed, whereas the bed of resin composed of the reaction product of dimethylpropanolamine and a chloromethylated vinyl-aromatic resin was 58 per cent regenerated to its hydroxide form by an amount of 1 normal sodium hydroxide solution chemically equivalent to the total capacity of the resin bed.

EXAMPLE 2

By procedure similar to that described in Example 1, a benzene-insoluble copolymer of 85 parts styrene, 9 parts ethylvinylbenzene and 6 parts divinylbenzene, was chloromethylated to obtain a vinyl-aromatic resin having chloromethyl radicals attached to the aromatic nuclei in the resin. A mixture consisting of 300 cc. of the granular chloromethylated resin, 300 cc. of dimethylethanolamine and 300 cc. of water was placed in a flask and heated to a reflux temperature for a period of 4 hours, with stirring. Thereafter, the aminated resin was separated from the reaction mixture by filtering and washed with water. The resin had a capacity equivalent to 1.17 cc. of a 1 normal hydrochloric acid solution per cubic centimeter of resin. An amount of the aminated resin having a total capacity equivalent to 529 cc. of a 1 normal sodium hydroxide solution, was placed in a glass tube having an internal diameter of 0.75 inch to form a resin bed 66 inches deep. The resin was converted to its chloride form by washing with a saturated aqueous solution of sodium chloride and then washed with distilled water. An aqueous 1 normal sodium hydroxide solution was passed downflow through the resin bed at a rate of 2 gallons per minute per square foot of cross-sectional area of the resin bed, i. e. about 30 cc. per minute, until 1063 cc. of solution was fed into the tower. This was followed by 510 cc. of distilled water. The effluent solution was titrated for sodium hydroxide. The resin absorbed hydroxyl ions equivalent to 461 cc. of a 1 normal sodium hydroxide solution, i. e. 87.2 per cent of the resin was regenerated to its hydroxide form.

EXAMPLE 3

A mixture consisting of 200 grams of orthodichlorobenzene, 0.6 gram of phosphorus trichloride and 61 grams of a granular benzene-insoluble copolymer of 90 parts by weight dimethylstyrene, 6 parts ethylvinylbenzene, and 4 parts divinylbenzene, was placed in a glass reaction flask equipped with a reflux condenser and stirrer. The mixture was heated to a temperature of from 105°-140° C. and chlorine passed into the liquid, under exposure to rays from an ultraviolet lamp, at a rate of one gram of chlorine per minute for a period of 5 hours. Thereafter, the chlorinated resin was separated from the reaction mixture, washed with acetone and then washed with water. The resin contained 49.69 per cent by weight chlorine, of which 11.09 per cent was nuclear chlorine. A mixture consisting of 5 cc. of the granular chlorinated resin, 10 cc of dimethylethanolamine and 10 cc. of water was placed in a flask and heated at a reflux temperature for 4 hours. The aminated resin was separated from the reaction mixture by filtering and washed with water. It had an anion exchange capacity equivalent to 0.73 cc. of a 1 normal hydrochloric acid solution per cubic centimeter of resin.

EXAMPLE 4

A purpose of this example is to show a comparison between the values of the selectivity constant K at equilibrium conditions, of anion exchange resins composed of the reaction products of tertiary alkyl amines and a vinyl-aromatic resin having halomethyl radicals attached to its aromatic nuclei and the anion exchange resins composed of the reaction products of tertiary mono- and di-alkyl N-substituted alkanol and alkanediol amines and such vinyl-aromatic resin. A mixture consisting of 800 grams of a granular benzene-insoluble copolymer of 85 parts styrene, 9 parts ethylvinylbenzene, 6 parts divinylbenzene, and 1500 cc. of chloromethyl methyl ether was placed in a reaction flask equipped with a reflux condenser and stirrer. The mixture was heated to a temperature of 47° C. for one-half hour, with stirring, then cooled to room temperature and 153 grams of zinc chloride added thereto as catalyst. The mixture was maintained at room temperature for 21.5 hours, then an additional 100 grams of zinc chloride and 400 cc. of chloromethyl methyl ether was added thereto and the reaction continued for a period of 31.5 hours longer. The chloromethylated resin was separated from the reaction mixture by filtering, was washed with acetone and then washed with water. A mixture consisting of 25 cc. of the chloromethylated resin, 50 cc. of an aqueous 25 per cent by weight trimethylamine solution and 50 cc. of ethyl alcohol was placed in a reaction flask and heated to a reflux temperature for a period of 4 hours. The aminated resin was separated from the reaction mixture by filtering and washed with water. The resin had a capacity equivalent to 0.76 cc. of a 1 normal hydrochloric acid solution per cubic centimeter of resin. A mixture consisting of 5 cc. of the aminated resin and 50 cc. of a one-tenth normal sodium hydroxide solution was sealed in a glass bottle and agitated for a period of 4 hours at room temperature. Thereafter, the aqueous solution was analyzed for chloride and hydroxyl ions and the value of the selectivity constant K at equilibrium conditions calculated. The anion exchange resin had a K value of 36.4. By similar procedure, separate portions of the chloromethylated resin was reacted with triethylamine and tributylamine and the ion exchange capacity and selectivity constant K determined. In similar manner, except using water instead of ethyl alcohol as the dispersing medium, separate portions of the chloromethylated resin was reacted with dimethylethanolamine, methyldiethanolamine, dimethylpropanolamine, 1-dimethylamino-2,3-propanediol, and the capacity and the selectivity of the aminated resins determined. The following table identifies the tertiary amine reactant, the value of the selectivity constant K, and the anion exchange capacity of the resin expressed as grains of calcium carbonate per cubic foot of resin bed.

*Table*

| Test No. | Tertiary Amine Reactant | K | Capacity, grs./cu. ft. |
|---|---|---|---|
| 1 | Trimethylamine | 36.4 | 16,800 |
| 2 | Triethylamine | 24.3 | 15,000 |
| 3 | Tributylamine | 31.7 | 17,500 |
| 4 | Dimethylethanolamine | 1.95 | 20,250 |
| 5 | Methyldiethanolamine | 0.77 | 17,180 |
| 6 | Dimethylpropanolamine | 4.2 | 20,600 |
| 7 | 1-Dimethylamino-2,3-propanediol | 0.95 | 17,200 |

Other modes of applying the principle of the invention may be employed instead of those explained, change being made as regards the method or products herein disclosed, provided the steps or products stated in any of the following claims or the equivalent of such stated steps or products be employed.

We claim:

1. A water-insoluble resinous composition suitable for the removal of anions from fluids, which comprises the reaction product of (1) a benzene-insoluble copolymer containing in chemically combined form from 0.5 to 40 per cent by weight of a polyvinyl-aromatic hydrocarbon and from 99.5 to 60 per cent of a monovinyl-aromatic compound of the class consisting of monovinyl-aromatic hydrocarbons having the vinyl radical directly attached to a carbon atom of the aromatic nucleus and nuclear halogenated derivatives thereof, which copolymer contains an average of from 0.2 to 1.2 halomethyl groups per aromatic nucleus in the copolymer, with (2) a tertiary amine selected from the group consisting of the tertiary mono- and di-alkyl N-substituted alkanol and alkanediol amines, in amount such that there is present in the reaction mixture at least one mole of the tertiary amine for each halomethyl group in the copolymer.

2. A water-insoluble resinous composition suitable for the removal of anions from fluids, which comprises the reaction product of (1) a benzene-insoluble copolymer containing in chemically combined form from 0.5 to 40 per cent by weight of a polyvinyl-aromatic hydrocarbon and from 99.5 to 60 per cent of a monovinyl-aromatic compound of the class consisting of monovinyl-aromatic hydrocarbons having the vinyl radical directly attached to a carbon atom of the aromatic nucleus and nuclear halogenated derivatives thereof, which copolymer contains an average of from 0.2 to 1.2 chloromethyl groups per aromatic nucleus in the copolymer, with (2) a tertiary amine selected from the group consisting of the tertiary mono- and di-alkyl N-substituted alkanol and alkanediol amines, in amount such that there is present in the reaction mixture at least one mole of the tertiary amine for each chloromethyl group in the copolymer.

3. A water-insoluble resinous composition suitable for the removal of anions from fluids, which comprises the reaction product of (1) a benzene-insoluble copolymer containing in chemically combined form at least 80 per cent by weight of styrene, together with lesser amounts of ethylvinylbenzene and divinylbenzene, which copolymer contains an average of from 0.2 to 1.2 chloromethyl groups per aromatic nucleus in the copolymer, with (2) a tertiary amine selected from the group consisting of the tertiary mono- and di-alkyl N-substituted alkanol and alkanediol amines, in amount such that there is present in the reaction mixture at least one mole of the tertiary amine for each chloromethyl group in the copolymer.

4. A water-insoluble resinous composition as described in claim 3, wherein the tertiary amine is a tertiary monoalkyl N-substituted alkanolamine.

5. A water-insoluble resinous composition as described in claim 3, wherein the tertiary amine is a tertiary dialkyl N-substituted alkanolamine.

6. A water-insoluble resinous composition as described in claim 3, wherein the tertiary amine is a tertiary monoalkyl N-substituted alkanediol amine.

7. A water-insoluble resinous compositon as described in claim 3, wherein the tertiary amine is a tertiary dialkyl N-substituted alkanediol amine.

8. A water-insoluble resinous composition as described in claim 3, wherein the tertiary amine is dimethylethanolamine.

9. A water-insoluble resinous composition as described in claim 3, wherein the tertiary amine is methyldiisopropanolamine.

10. A water-insoluble resinous composition as described in claim 3, wherein the tertiary amine is 1-dimethylamino-2,3-propanediol.

11. A water-insoluble resinous composition as described in claim 3, wherein the tertiary amine is methyldiethanolamine.

12. A water-insoluble resinous composition as described in claim 2, wherein the benzene-insoluble copolymer is a copolymer of from 80 to 99.5 per cent by weight of styrene and from 20 to 0.5 per cent of divinylbenzene and the tertiary amine is dimethylethanolamine.

WILLIAM C. BAUMAN.
ROBERT McKELLAR.

REFERENCES CITED

The following references are of record in the file of this patent:

UNITED STATES PATENTS

| Number | Name | Date |
|---|---|---|
| 2,366,007 | D'Alelio | Dec. 26, 1944 |
| 2,366,008 | D'Alelio | Dec. 26, 1944 |
| 2,409,861 | Hunter | Oct. 22, 1946 |

FOREIGN PATENTS

| Number | Country | Date |
|---|---|---|
| 478,571 | Great Britain | Jan. 17, 1938 |